US010530009B2

(12) United States Patent
Anandan et al.

(10) Patent No.: US 10,530,009 B2
(45) Date of Patent: Jan. 7, 2020

(54) SOLID STATE BATTERY

(71) Applicant: FORD GLOBAL TECHNOLOGIES, LLC, Dearborn, MI (US)

(72) Inventors: Venkataramani Anandan, Farmington Hills, MI (US); Andrew Robert Drews, Ann Arbor, MI (US); Theodore James Miller, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 15/466,011

(22) Filed: Mar. 22, 2017

(65) Prior Publication Data

US 2018/0277889 A1 Sep. 27, 2018

(51) Int. Cl.

| | |
|---|---|
| ***H01M 10/0562*** | (2010.01) |
| ***H01M 10/052*** | (2010.01) |
| ***H01M 10/058*** | (2010.01) |
| ***H01M 10/056*** | (2010.01) |
| ***H01M 10/0525*** | (2010.01) |

(52) U.S. Cl.

CPC ..... *H01M 10/0562* (2013.01); *H01M 10/052* (2013.01); *H01M 2300/008* (2013.01); *H01M 2300/0071* (2013.01); *H01M 2300/0085* (2013.01); *H01M 2300/0088* (2013.01)

(58) Field of Classification Search

None

See application file for complete search history.

(56) References Cited

U.S. PATENT DOCUMENTS

| | | | | |
|---|---|---|---|---|
| 9,246,188 B2 | 1/2016 | Zhao et al. | | |
| 2008/0118834 A1* | 5/2008 | Yew | C01G 31/006 429/217 | |
| 2014/0113187 A1 | 4/2014 | Winoto et al. | | |
| 2016/0308243 A1* | 10/2016 | Herle | H01M 4/134 | |

FOREIGN PATENT DOCUMENTS

| | | |
|---|---|---|
| KR | 2017/012962 A * | 2/2017 |
| WO | 2016131008 A1 | 8/2016 |

OTHER PUBLICATIONS

English translation for KR 2017/012962 A (Year: 2017).*

* cited by examiner

*Primary Examiner* — Sin J Lee

(74) *Attorney, Agent, or Firm* — David Kelley; Brooks Kushman P.C.

(57) ABSTRACT

A method of forming a solid state battery is disclosed. In a moisture-free inert atmosphere, the method includes combining unreacted solid electrolyte precursors to form a green sheet, stacking the green sheet in between porous electrodes to form a solid state battery, and heating the battery to a melting point temperature of the precursors such that the precursors form a liquid phase penetrating pores in the electrodes to form ion conducting channels in the battery.

17 Claims, 2 Drawing Sheets

SOLID STATE BATTERY

TECHNICAL FIELD

The present disclosure relates to a solid state battery, a process to make the same, and a method of producing a solid state battery while minimizing exposure of the solid electrolyte to atmospheric air during the fabrication process.

BACKGROUND

Solid state batteries (SSB)s include solid electrodes and a solid electrolyte material. Various methods of forming SSBs have been developed. Yet, fabricating a high energy density SSB has been a challenge, for example due to high sensitivity of suitable solid electrolytes to atmospheric moisture. It has also been difficult to achieve good interfacial resistance between active material of the electrodes and the solid electrolyte particles. For example, sintering at high temperatures of about 900° C. is used to provide interfacial contact between the electrolyte and the active material, but eliminates the use of carbon as an electronic conductor due to the high temperatures.

SUMMARY

According to one embodiment, a solid state battery is disclosed. The method is performed in a moisture-free inert atmosphere. The method includes combining unreacted solid electrolyte precursors to form a green sheet. The method further includes stacking the green sheet in between porous electrodes to form a solid state battery. The method includes heating the battery to a melting point temperature of the precursors such that the precursors form a liquid phase penetrating pores in the electrodes to form ion conducting channels in the battery. The solid electrolyte may be lithium rich anti-perovskite. The melting point temperature of the precursors is lower than a melting point of any other component of the solid state battery. The method may further include compressing the green sheet and porous electrodes together prior to the heating. The method may also include cooling the solid state battery to solidify the liquid phase. The method may include maintaining a temperature gradient perpendicular to the battery during the cooling to induce directional grain growth of the solid electrolyte. The electrodes may include an electronic additive unreactive with the solid electrolyte. The solid state battery may further include an inorganic coating on at least one electrode-electrolyte interface.

In an alternative embodiment, a method of producing a solid state battery is disclosed. The method is performed in an inert atmosphere. The method includes impregnating porous electrodes with unreacted precursors of a first and second solid electrolyte. The method also includes inserting a sheet of unsintered solid electrolyte in between the electrodes to form a solid state battery assembly. The method further includes heating the assembly to a melting point temperature of the precursors such that the precursors liquefy and form ion conducting channels between the electrodes. The first and second solid electrolytes may have different chemical composition. The unsintered solid electrolyte may include the same precursors as the first solid electrolyte, the second solid electrolyte, or both. The sheet may include more than one layer. The melting point temperature of the precursors is lower than a melting point of any other component of the solid state battery. The first electrolyte, the second electrolyte, the unsintered electrolyte, or a combination thereof may include lithium rich anti-perovskite.

In a yet alternative embodiment, a method of producing a solid state battery is disclosed. The method is performed in an inert atmosphere. The method includes impregnating a porous high temperature polymer structure with unreacted precursors of a first solid electrolyte. The method includes impregnating porous electrodes with unreacted precursors of a second and third solid electrolyte. The method may further include stacking the impregnated polymer structure between the impregnated electrodes to form a solid state battery assembly. The method further includes heating the assembly to a melting point temperature of the precursors such that the precursors liquefy and form ion conducting channels between the electrodes, and that the polymer structure maintains a distance between the electrodes. The first, second, and third solid electrolyte may include the same precursors. The high temperature polymer structure may include polytetrafluoroethylene. The high temperature polymer structure may include a porous fiber mat or an ion non-conducting material. The melting point temperature of the precursors is lower than a melting point of any other component of the solid state battery. The method may further include cooling the assembly to solidify the first, second, and third electrolytes.

DETAILED DESCRIPTION

Figure 1:
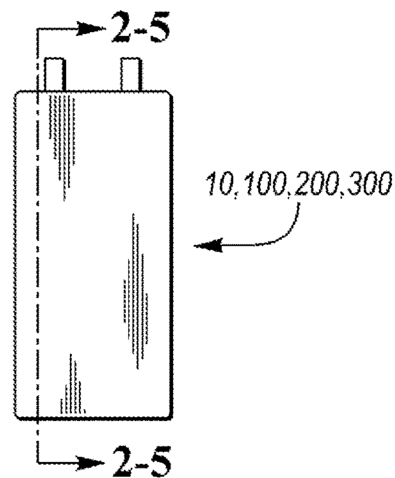
FIG. 1 depicts a perspective side view of a solid state battery in accordance with one embodiment.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

SSBs have both solid electrodes and solid electrolyte. The solid state battery cells are based on ceramic electrolytes which are a promising alternative to flammable and unstable liquid electrolytes for batteries. In addition, SSBs offer significant improvement in volumetric energy density and safety over conventional lithium-ion batteries.

By using a solid instead of a liquid electrolyte in SSBs, many of the risks associated with overcharge, over-temperature, or short circuits are eliminated. Nevertheless, typical SSBs that have demonstrated performance and durability have only been fabricated with very thin electrode layers (<10 μm). Additionally, the typical SSBs provide relatively low capacities suitable for use in low energy applications such as smart-cards. For high energy density applications such as automotive applications, thicker electrodes (>50 μm) are required. Yet, fabricating thick electrodes that provide both good electronic and ionic conduction in SSBs is challenging.

Conventional Li-ion battery electrodes achieve high electronic conductivity by incorporating carbon into the electrode slurries during manufacturing process. Carbon subsequently forms bridges between active material particles and a thin coating over active material particles when dried. Good ionic conduction is achieved by filling the pores of the electrodes with a liquid electrolyte.

To produce SSB electrodes with similar performance as the Li-ion battery electrodes, the solid electrolyte must achieve a similar level of dispersion within the electrodes while also having good contact with the particles of the electrode active material. For most inorganic solid electrolytes, the best method to achieve good interfacial contact between particles is through sintering at high temperatures (above 900° C.). But, such high temperature fabrication eliminates the possibility of using carbon as an electronic conductor because carbon readily oxidizes in an oxygen-containing environment at these temperatures. Performing the same sintering operation in an inert atmosphere may prevent reaction of added carbon with oxygen from the furnace atmosphere, but cannot prevent extraction of oxygen from the solid electrolyte or active materials. In fact, carbon is frequently used as a reductant to abstract oxygen from metal oxides as a means of producing metals.

Desirable electrolytes such as lithium-rich anti-perovskite (LiRAP) or lithium borohydride ($LiBH_4$), are also very sensitive to atmospheric moisture, which adds manufacturing complexity. An additional challenge is achieving good interfacial resistance between the electrode active material and the solid electrolyte particles. In light of the foregoing, there is a need for a manufacturing method of an SSB that can eliminate or minimize exposure of the electrolyte to atmospheric air during the fabrication process and simultaneously provide intimate contact between active materials and the solid electrolyte to result in good interfacial resistance between the active material and the solid electrolyte.

A SSB fabrication method solving one or more of the above-mentioned disadvantages is presented herein. During the fabrication method, a solid electrolyte or a mixture of solid electrolytes are formed in-situ during a SSB cell assembly while protected from atmospheric moisture. The fabrication is performed in a moisture-free and/or inert atmosphere or in a vacuum. Moisture-free relates to an environment having a dew point of about −40° C. Moisture-free relates to an environment having relative humidity of 50, 40, 30, 20, 10, 5%, or less. Inert atmosphere relates to an atmosphere having a gaseous mixture that has little or no oxygen and primarily includes non-reactive gases such as $N_2$, $Ar_2$, $He_2$, $Cr_2$, $Xe_2$, $CO_2$, or a combination thereof.

In at least one embodiment, precursors of a solid electrolyte are mixed in their stoichiometric ratio with added binder and formed into a green tape. The term "green" relates to uncured or unsintered material in which the precursors do not react with each other. The green tape is subsequently divided into green sheets, for example, by cutting or slicing. The precursors in the green sheet remain unsintered. One or more green tapes may be formed for a single battery. The chemical composition of the precursors depends on the chemical composition of the desired electrolyte. The chemical composition of each tape may be the same or different, as will be further discussed below. The dimensions of each tape may be the same or different.

The one or more green sheets are placed in between a cathode and an anode. The green sheets may be sandwiched in such a way that the green sheets are in direct contact with a surface of each electrode. The green sheets and the electrodes may be compressed to provide intimate contact and adhesion between the electrode active material and the green sheets. Compression may be especially desirable if at least one of the cathode, the anode, and the electrolyte include multiple layers. The sandwiched green sheets and the electrodes are inserted into an open battery casing. The casing may be a pouch, a sheath, a jacket, or the like. The open unsealed casing with the sandwiched electrodes and green sheets, an assembly, is subsequently evacuated and heated to an elevated temperature which is equal to or higher than a melting point temperature of the precursors, but which is lower than melting point of any other material of the assembly. The temperature is a reaction temperature of the precursors or a temperature at which the precursors react with each other. During the heating, the precursors react and form a solid electrolyte phase. After the desired electrolyte composition is formed, the battery cell is sealed, and optionally cooled.

The casing is sealed while still in vacuum or in an inert atmosphere to form a battery cell. In some embodiments, the battery cell sealing may be performed at room temperature (between about 18° C. and 25° C.) provided that the battery cell is maintained in vacuum or in an inert dry atmosphere. Since the entire formation and integration process is performed under vacuum or in an inert atmosphere, the exposure to atmospheric air is either entirely eliminated or at least reduced in comparison to typical SSB fabrication process. Thus, the entire SSB is fabricated without the solid electrolyte ever being exposed to the atmosphere.

In at least some embodiments, the reaction of the precursor components forms a liquid electrolyte phase or melt phase when the reaction temperature is above the melting point of the solid electrolyte phase. The liquid phase is capable of penetrating or infiltrating the pores of the electrodes and wetting the surfaces of the active material particles of the electrodes. On cooling, the solid electrolyte phase crystalizes, leading to intimate contact between the solid electrolyte phase and the active materials. A non-limiting example of such an embodiment is depicted in FIG. 1, which is discussed below.

The electrolyte utilized in the embodiments described herein may include any SSB-compatible electrolyte capable of providing high ionic conductivity provided that the melting point temperature of the electrolyte is lower than the melting point temperature of other materials in the battery cell. Non-limiting example electrolytes include lithium lanthanum zirconium oxide (LLZO), lithium phosphorus oxynitride (LIPON), lithium lanthanum titanium oxide (LLTO), lithium-ion rich anti-perovskite (LiRAP), lithium borohydride, lithium iodide (LiI), lithium peroxide, or the like. Among these, LiRAP provides high ionic conductivity with low energy barrier for lithium transport, a wide electrochemical window, a low melting temperature (282° C.) and can be easily crystalized from a liquid phase of the same composition as the electrolyte melts congruently. The relatively low melting temperature and congruent melting enable incorporation of LiRAP into battery cells while overcoming the deficiencies associated with incorporating high temperature ceramic solid electrolytes into SSB electrodes.

The perovskite structure incorporates two cations in equal molar ratio with oxygen in a general formula of $ABO_3$, where A and B are metal cations, and the A cation is positioned between corner-sharing $BO_6$ ocatahedra. The prototypical perovskite material is CaTiO3, but many combinations of cations can be used to produce the same or related structures. An antiperovskite structure features two anions and one cation and can form using a variety of anions. In an antiperovskite, the anions are arrayed in sites corresponding to the cations in the perovskite structure, and the cations of the antiperovskite structure occupy sites that correspond to the anions of the perovskite structure.

LiRAP has a general formula of $Li_3OX$ where X is Cl, Br, F, or the like, with the second anion being oxygen. Though LiRAP has important properties that make it attractive for use in SSBs, its development has been hindered due to its severe sensitivity to atmospheric moisture, which makes traditional SSB fabrication processes challenging.

LiRAP may be formed by a reaction between precursors at relatively low temperatures of about 300° C. As was stated above, the chemical composition of the precursors determines the chemical composition of the electrolyte material, and vice versa. Example precursors may be $Li_2O$ and LiCl, which react to form $Li_3OCl$. Alternative precursors include LiBr, LiF, and the like. While LiRAP and its precursors are discussed herein, other electrolytes mentioned above are likewise formed by reaction of their respective precursors at a relatively low melting temperature of up to about 150° C., 200° C., 250° C., 300° C., 350° C., 400° C., 450° C., or 500° C. Depending on the type of electrolyte used, the respective precursors may be less susceptible to moisture than the electrolyte.

As was stated above, the melting temperature of LiRAP is 282° C. At this temperature, a liquid phase with the same composition as $Li_3OCl$ forms. On cooling, $Li_3OCl$ crystallizes in the antiperovskite structure. The low fabrication temperature allows incorporation of an inexpensive electronic additive such as carbon into the electrodes of SSB since LiRAP is not reactive with carbon at and about the LiRAP melting temperature. Thus, carbon can be utilized as a desirable additive.

The in-situ formation of a solid electrolyte described herein may also provide improved electrode/electrolyte grain boundary resistance and ionic transport when compared to conventionally prepared SSBs. Since the solid electrolyte solidifies in-place, it can provide close contact between grains, and with fewer grain boundaries than conventional SSB electrolytes. During the growth or crystallization of the solid electrolyte from the liquid electrolyte phase, the grains grow into the electrode from multiple locations, leading to very tight grain electrode/electrolyte boundaries. This is in contrast with sintered solid electrolyte materials, where voids and weak grain boundaries are typical. In some embodiments, directional grain growth may be induced to optimize ionic transport in solid electrolytes that have anisotropic conduction. Directional grain growth may be induced, for example, by maintaining a temperature gradient perpendicular to the battery cell during the solidification process.

As is further discussed below, the battery cell may contain one or more types of electrolyte. For example, a first electrolyte may be more compatible with the anode and a second electrolyte may be more compatible with the cathode. The electrolyte may be arranged as a green sheet. Different types of electrolyte may be arranged as discreet green sheets adjacent to each other such that the electrolyte green sheets are in direct contact with each other. Alternatively, or in addition, electrolyte precursors may be impregnated into the active material of one or more electrodes. For example, a first electrolyte may be impregnated into the pores of an anode and as a green sheet adjacent to the anode while a second electrolyte may be impregnated into the pores of a cathode and as a green sheet adjacent to the cathode. Thus, the separator contains two different types of electrolyte precursors, arranged as discreet green sheets. Each green sheet may represent a separate layer. Each layer may include at least one sublayer.

The electrodes may be prefabricated. The electrodes may include one or more layers. The electrodes are fabricated separately and may be fabricated by any suitable method. For example, the anode or cathode may be made by casting a slurry of graphite, one or more binders, and one or more solvents onto a metal current collector, evaporating the solvent, and optionally compacting the electrode.

The anode may be made from any Li-ion battery anode material such as lithium metal, lithium metal alloys, oxides such as lithium titanate, graphite, silicon composite, or other suitable materials. The cathode may include any Li-ion cathode active material, one or more additives, and a binder. Li-ion battery cathode material may include lithium cobalt oxide ($LiCoO_2$; LCO), lithium nickel cobalt manganese oxide ($LiNiCoMnO_2$; NMC), spinel, or the like. The one or more additives may include conductive carbon. The binder may be a binder with a high melting point or a binder which remains unreactive at the melting point temperature of the electrolyte precursors. Any material included in the anode and cathode has to be stable and unreactive at the temperature required to convert the solid electrolyte precursors into the solid electrolyte. Thus, for example, when LiRAP is the electrolyte having a melting temperature of 282° C., any material forming the electrodes has to have a higher melting temperature and remain stable and unreactive at the temperature of about 282° C. or lower. Non-limiting example polymer binder materials include polytetrafluoroethylene (PTFE or Teflon™), a polyester resin such as biaxially-oriented polyethylene terephthalate (boPET or Mylar®), or a polyimide material such as poly(4,4'-oxydiphenylene-pyromellitimide) (Kapton®).

While a variety of materials may be used, an example battery cell may include lithium metal anode, a high voltage cathode, and a LiRAP electrolyte or if more than one electrolyte is used, the battery cell may include LiRAP and lithium borohydride. If more than one electrolyte is used in the same battery cell, the battery cell is heated at least to the melting temperature of the electrolyte with the highest melting point temperature. For example, if the combination of electrolytes includes LiRAP (melting temperature of 282° C.) and lithium borohydride (melting temperature of 275° C.), the battery cell assembly needs to be heated to at least 282° C.

The electrodes are porous. The degree of porosity may differ for each electrode. The level of porosity and the dimensions of the pores may be such that the precursors and/or additional materials forming the unsintered electrolyte may penetrate the pores, and upon melting, the electrolyte may form ion conducting channels in the battery cell. The pores may form about 30, 40, 50, 60, 70%, or more volume % of the electrode, based on the total volume of the electrode. Yet, the porous electrode should be robust enough to withstand the fabrication process and use without shattering, cracking, or the like. The pores may have any shape and configuration. At least some of the pores may have the same shape, configuration, and/or dimensions as other pores. The pores may be configured as one or more channels. The channels may be interconnected. The channels may run along the x, y, or z axis. The channels may have the same or different dimensions such as height, width, or depth. The electrodes may be designed and prefabricated to contain a desired number, density, and geometry of the pores. For example, the electrodes may be extruded such that the pores form a plurality of channels in a desired direction. The pores may be formed in a random or regular fashion. The pores may form a pattern. The pores may have any cross-section such as circular, oval, rectangular, square, regular, irregular, symmetrical, asymmetrical, or the like. Once the liquid phase electrolyte solidifies in the pores, the solid electrolyte forms continuous paths of ionic movement within the battery.

In at least one embodiment, the electrodes may be free from a binder, and the solidified electrolyte may act as the binder once impregnated into the pores of the electrodes or once the molten electrolyte penetrates the pores and solidifies therein. In another embodiment, the battery cell may be binder-less system.

The battery casing may be made from a flexible, rigid, or semi-rigid material. The material may be, for example, a polymeric material, a metal material, or a combination thereof. The casing may include current collector tabs which are formed from metal, typically copper and aluminum, are which are to be aligned and connected with the electrodes to provide external current connections.

Figure 2:
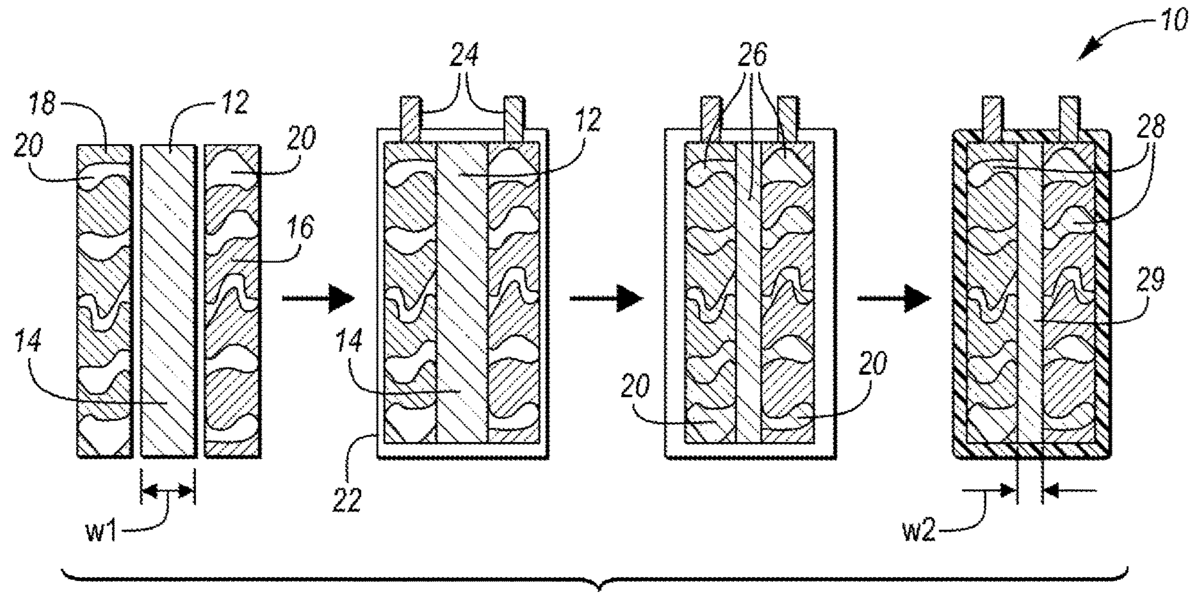
FIG. 2 schematically depicts a sequence of steps to fabricate the solid state battery depicted in FIG. 1.

An example SSB, fabrication of which is described herein, is depicted in FIG. 1. In one or more embodiments, as depicted in FIG. 2, a SSB 10 fabrication method may include combining unreacted solid electrolyte precursors 12 to form a green tape. The green tape may be divided into green sheets 14. A green sheet 14 is subsequently stacked between porous electrodes, the anode 16 and the cathode 18 having pores 20. The stack of the green sheet 14 and the electrodes 16, 18 is placed in an open casing 22 with incorporates current collector tabs 24 for each electrode to form the battery 10. The battery 10 is evacuated and heated to a melting point temperature of the precursors 12 such that the precursors 12 form a liquid phase 26 penetrating the pores 20 in the electrodes 16, 18. The liquid electrolyte 26 thus forms ion conducting channels 28 in the electrodes 16, 18. The method is performed in a moisture-free inert atmosphere.

Figure 3:
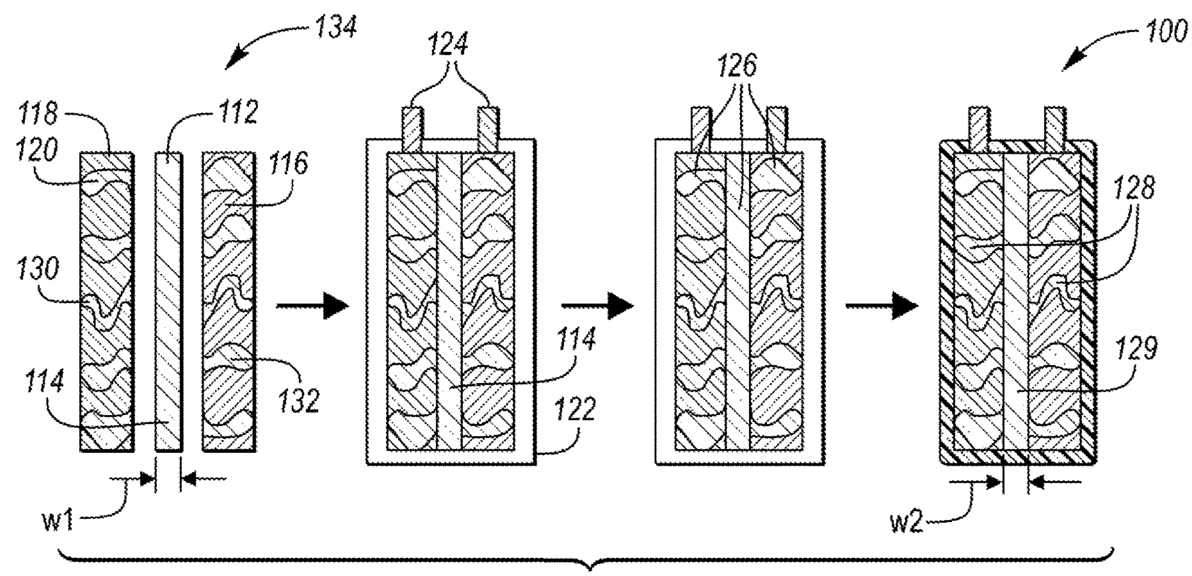
FIG. 3 schematically depicts an alternative sequence of steps to produce the solid state battery of FIG. 1.
Figure 4:
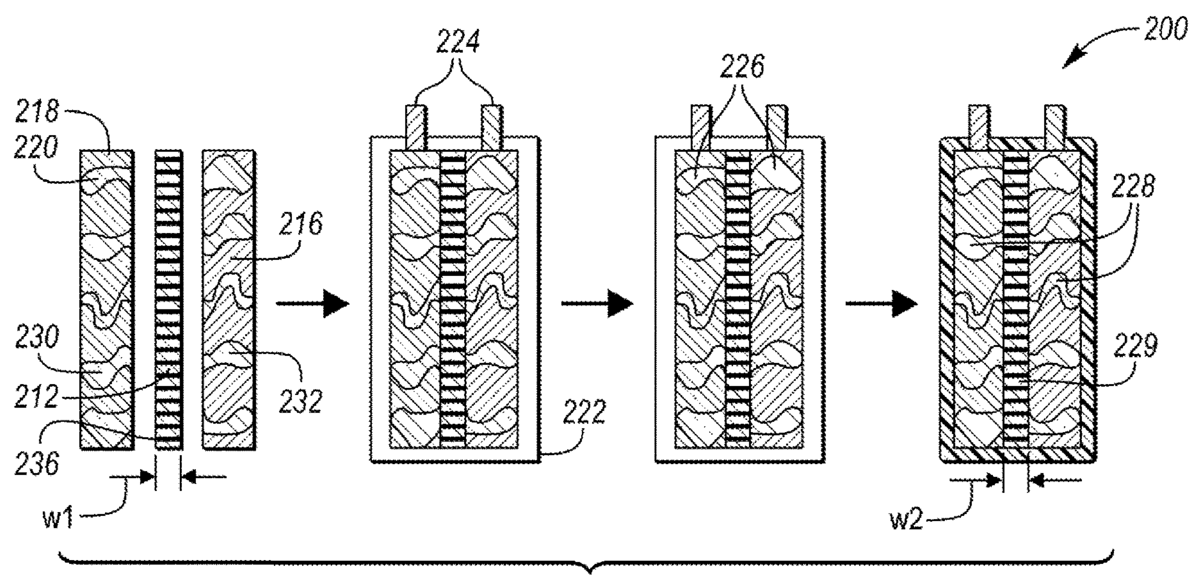
FIG. 4 schematically shows another alternative method of forming the solid state battery of FIG. 1.

In an alternative embodiment, depicted in FIG. 3, another method of fabricating a SSB 100 is disclosed. In at least this embodiment, the porous electrodes 116, 118 are impregnated with solid electrolyte precursors of a first electrolyte 130 and a second electrolyte 132. A sheet of unsintered solid electrolyte 114 is inserted between the electrodes 116, 118 to form an assembly 134. The assembly 134 is heated to a melting point temperature of the precursors 112 such that the precursors 112 liquefy and form ion conducting channels 128 between the electrodes 116, 118.

In at least the embodiment depicted in FIG. 3, the first electrolyte 130, the second electrolyte 132, and the unsintered solid electrolyte 114 may have the same or different composition. The unsintered solid electrolyte 114 may have the same or different composition as at least the first electrolyte or the second electrolyte 132. The unsintered solid electrolyte 114 may have the same composition as both the first electrolyte or the second electrolyte 132. Thus, the first electrolyte 130, the second electrolyte 132, and the unsintered solid electrolyte 114 may include the same or different precursors. The unsintered solid electrolyte 114 may include one or more discreet layers, each layer including a different composition corresponding to precursors impregnated within an electrode adjacent to the respective layer. All three electrolytes 130, 132, and 114 may have at least one precursor in common, for example $LiO_2$. Furthermore, since the precursors are already impregnated into the electrodes 116, 118, the entire fabrication process may be performed at atmospheric pressure in an inert atmosphere.

The fabrication method may determine and/or influence dimensional stability of the final solid electrolyte separator. Compared to the method of fabricating SSB 10, schematically depicted in FIG. 2, fabrication of the SSB 100, schematically depicted in FIG. 3, leads to the better dimensional stability of the solid electrolyte separator. In the embodiment of FIG. 2, the electrolyte, once in a molten state, floods the pores 20 and is thus partially dispersed into the electrodes 16, 18. The width of the green sheet 14 $w_1$ is thus greater than width of the separator 29 $w_2$ after the precursors react and the electrolyte solidifies. In contrast, the width $w_1$ of the green sheet 114 is equal to the width $w_2$ of the solid electrolyte separator 129 in the embodiment of FIG. 3 because the electrodes 116, 118 were impregnated with precursors in addition to the precursor-containing green sheet 114.

To further increase dimensional stability of the separator, a yet alternative method of fabricating a SSB 200 is disclosed. The method is performed in an inert atmosphere. The method includes a sheet 236. The sheet 236 may be a polymer sheet. The sheet 236 is porous. The sheet 236 material has a melting point temperature higher than the precursors 212 of any electrode included in the battery 200. The polymer may be a high temperature polymer such as polytetrafluoroethylene (PTFE or Teflon™), a polyester resin such as biaxially-oriented polyethylene terephthalate (boPET or Mylar®), or a polyimide material such as poly (4,4'-oxydiphenylene-pyromellitimide) (Kapton®). The sheet 236 may be flexible or rigid. The sheet 236 may contain the precursors such that the electrolyte retains its dimensions even after solidifying. While the molten electrolyte may intermix with the molten electrolyte present in the pores, majority of the electrolyte precursor remain within the area defined by the polymer sheet. Thus, the width $w_1$ of the precursors 212 within the sheet 236 equals the width 1422 of the solid electrolyte separator 229. The sheet 236 may also prevent contact between the anode 216 and the cathode 218 during the fabrication process.

Alternatively, the sheet 236 material may be a porous woven or non-woven material such as a fiber mat. Examples of suitable materials may include synthetic or natural biofibers as long as the material has a melting point temperature higher than the melting point temperature of the precursors. Suitable fibers may include cotton, wool, flax, jute, coconut, hemp, straw, grass, and other fibers available directly from natural sources, as well as chemically modified natural fibers, for example chemically modified cellulose fibers, cotton fibers, etc. The named natural fibers are illustrative and not limiting. Examples of chemically modified fibers may also include azlon (regenerated natural proteins), regenerated cellulose products including cellulose xanthate (rayon), cellulose acetate, cellulose triacetate, cellulose nitrate, alginate fibers, casein-based fibers, and the like. Synthetic fibers may include polymeric fibers of the materials listed above, inorganic materials such as glass or ceramic fibers, or the like.

Figure 5:
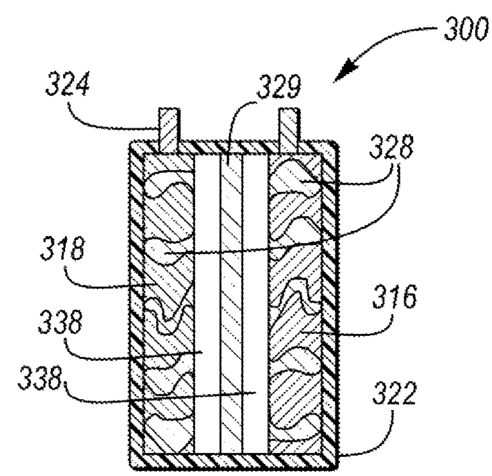
FIG. 5 shows a cross-section of the solid state battery depicted in FIG. 1 along the lines 2-5.

To avoid direct contact between the opposing electrodes, one or more additional layers may be included, as is schematically depicted in FIG. 5. The battery cell 300 includes an anode 316, cathode 318, solid electrolyte separator 329 in a casing 322. The battery also includes two layers 338. Yet, in an alternative embodiment, just one layer 338, adjacent either to the anode 316 or the cathode, is disclosed. The layer 338 includes a non-reactive (inert), porous, matrix material that remains interposed between the two electrodes 316, 318 as the liquid phase is wicked into the porous electrodes 316, 318. At the same time, the layers 338 simultaneously allow grains of the solid electrolyte to crystallize through the thickness of the inert matrix material 338. The material 338 may be inorganic. The layer 338 may be applied as a coating. Alternatively, the material 338 may be applied as a green tape sandwiched between the electrode and the separator and/or the sheet 236.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming a solid state battery, the method comprising:

in a moisture-free inert atmosphere, combining unreacted solid electrolyte precursors to form a green sheet;

stacking the green sheet in between porous electrodes to form a solid state battery;

heating the battery to a melting point temperature of the precursors such that the precursors form a liquid phase penetrating pores in the electrodes to form ion conducting channels in the battery;

cooling the solid state battery to solidify the liquid phase; and maintaining a temperature gradient perpendicular to the battery during the cooling to induce directional grain growth of the solid electrolyte.

2. The method of claim 1, wherein the solid electrolyte is lithium rich anti-perovskite.

3. The method of claim 1, wherein the melting point temperature of the precursors is lower than a melting point of any other component of the solid state battery.

4. The method of claim 1 further comprising compressing the green sheet and porous electrodes together prior to the heating.

5. The method of claim 1, wherein the electrodes comprise an electronic additive unreactive with the solid electrolyte.

6. The method of claim 1, wherein the solid state battery further comprises an inorganic coating on at least one electrode-electrolyte interface.

7. A method of producing a solid state battery, the method comprising:

in a moisture-free inert atmosphere, impregnating porous electrodes with unreacted precursors of a first and second solid electrolyte, the first and second solid electrolytes having different chemical composition;

inserting a sheet of unsintered solid electrolyte in between the electrodes to form a solid state battery assembly; and heating the assembly to melting point temperatures of the precursors such that the precursors liquefy and form an ion conducting channel between the electrodes.

8. The method of claim 7, wherein the sheet comprises same precursors as the first solid electrolyte, the second solid electrolyte, or both.

9. The method of claim 7, wherein the sheet comprises more than one layer.

10. The method of claim 7, wherein the melting point temperatures of the precursors are lower than a melting point of any other component of the solid state battery.

11. The method of claim 7, wherein the first electrolyte, the second electrolyte, the unsintered electrolyte, or a combination thereof comprise lithium rich anti-perovskite.

12. A method of producing a solid state battery, the method comprising:

in an inert atmosphere, impregnating a porous polymer structure with unreacted precursors of a first solid electrolyte, impregnating porous electrodes with at least one type of an unreacted precursor of a second and third solid electrolyte, stacking the impregnated polymer structure between the impregnated electrodes to form a solid state battery assembly, and heating the assembly to a melting point temperature of at least one of the precursors such that at least one of the precursors liquefies and forms an ion conducting channel between the electrodes wherein the porous polymer structure has a melting point temperature higher than the melting point temperature of the precursors such that the distance between the electrodes is maintained by the polymer structure.

13. The method of claim 12, wherein the first, second, and third solid electrolyte comprises same precursors.

14. The method of claim 12, wherein the porous polymer structure comprises polytetrafluoroethylene.

15. The method of claim 12, wherein the porous polymer structure comprises a porous fiber mat or an ion non-conducting material.

16. The method of claim 12, wherein the melting point temperatures of the precursors are lower than a melting point of any other component of the solid state battery.

17. The method of claim 12 further comprising cooling the assembly to solidify the first, second, and third electrolytes.

* * * * *